US006494502B1

(12) United States Patent
Plante

(10) Patent No.: US 6,494,502 B1
(45) Date of Patent: Dec. 17, 2002

(54) CONNECTOR FOR SMALL ANIMAL CAGE SYSTEMS

(75) Inventor: Robin Plante, Sainte-Barbe (CA)

(73) Assignee: Rolf C. Hagen, Inc., Montreal (CA)

( * ) Notice: Subject to any disclaimer, the term of this patent is extended or adjusted under 35 U.S.C. 154(b) by 25 days.

(21) Appl. No.: 09/745,699

(22) Filed: Dec. 21, 2000

(51) Int. Cl.[7] .............................. F16L 17/00; F16L 19/00
(52) U.S. Cl. ........................ 285/373; 285/280; 285/314; 285/358; 285/408; 285/415
(58) Field of Search ................................. 285/411, 415, 285/280, 314, 358, 423, 408

(56) References Cited

U.S. PATENT DOCUMENTS

| | | | |
|---|---|---|---|
| 1,477,440 A | | 12/1923 | Grier, Jr. |
| 3,742,908 A | | 7/1973 | Merino |
| D231,372 S | | 4/1974 | Willinger et al. |
| 3,859,961 A | | 1/1975 | Willinger et al. |
| D256,956 S | | 9/1980 | Stewart et al. |
| 4,632,437 A | | 12/1986 | Robson et al. |
| 4,733,438 A | * | 3/1988 | Stupakis ................. 285/358 |
| 5,383,691 A | * | 1/1995 | Anthony ................. 285/325 |
| 6,102,450 A | * | 8/2000 | Harcourt ................. 285/423 |
| 6,179,346 B1 | * | 1/2001 | Robson ................... 285/358 |
| 6,250,686 B1 | * | 6/2001 | Becker et al. ........... 285/423 |

FOREIGN PATENT DOCUMENTS

| DE | 9115401 | | 4/1992 |
|---|---|---|---|
| DE | 4327461 | A1 | 10/1994 |

* cited by examiner

*Primary Examiner*—Lynne H. Browne
*Assistant Examiner*—Aaron Dunwoody
(74) *Attorney, Agent, or Firm*—Wolf, Greenfield & Sacks, P.C.

(57) ABSTRACT

A connector for joining two tubular members together includes inner and out concentric rings that are joined together in a manner that permits the outer ring to turn relative to the inner ring. The inner side of the inner ring has two seats to engage the ends of the tubular members that are to be joined together. The outer side of the inner ring and the inner side of the outer ring have camming members that when engaged cause the outer ring to exert compressive forces on the inner ring that in turn causes the inner ring to firmly grip the tubular members. The inner ring preferably has a gasket-like material in each of the seats that firmly engages the ends of the tubular members. When the camming members are disengaged, the ends of the tubular members may be inserted into or removed from the connector so as to separate the parts from one another.

22 Claims, 5 Drawing Sheets

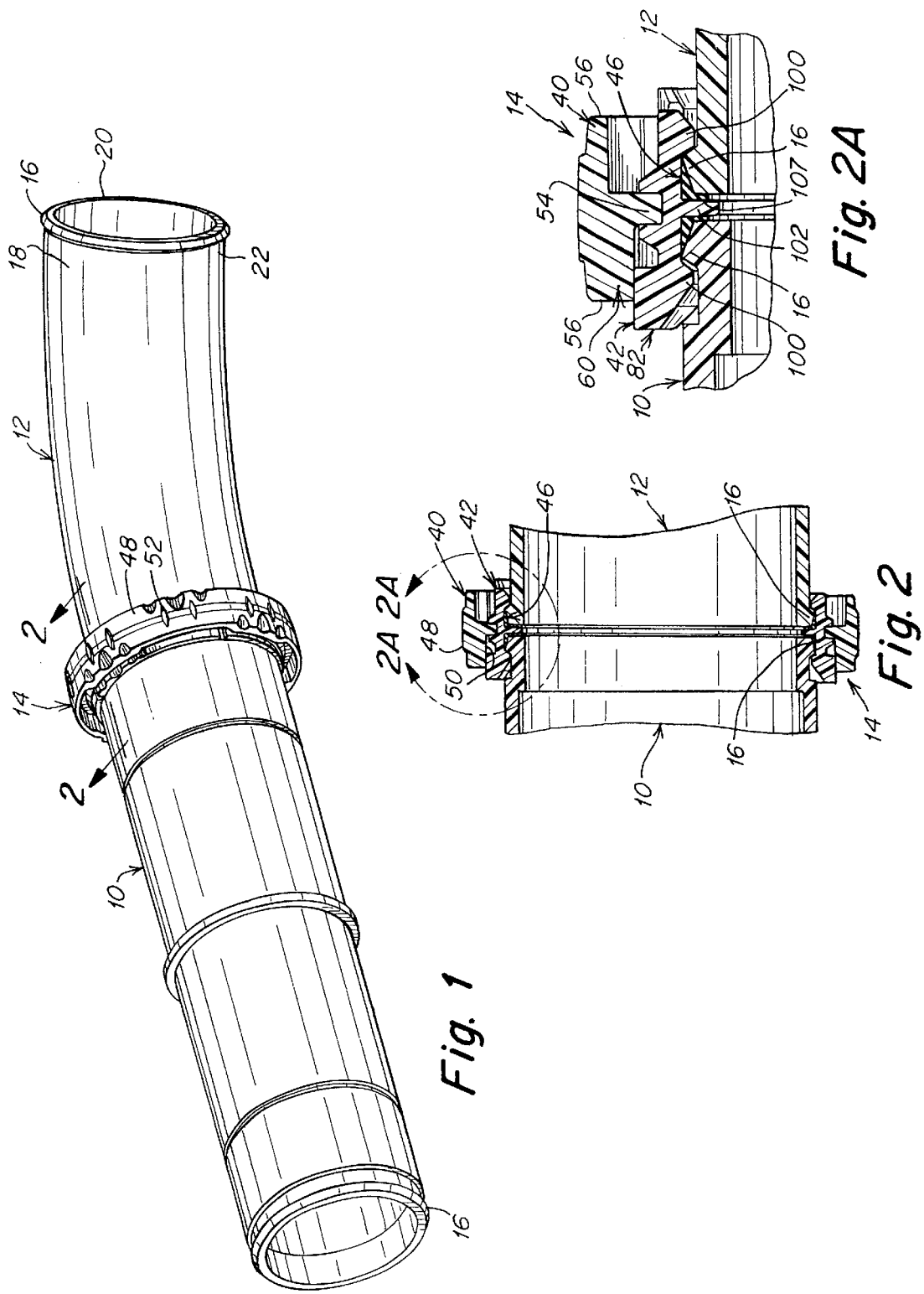

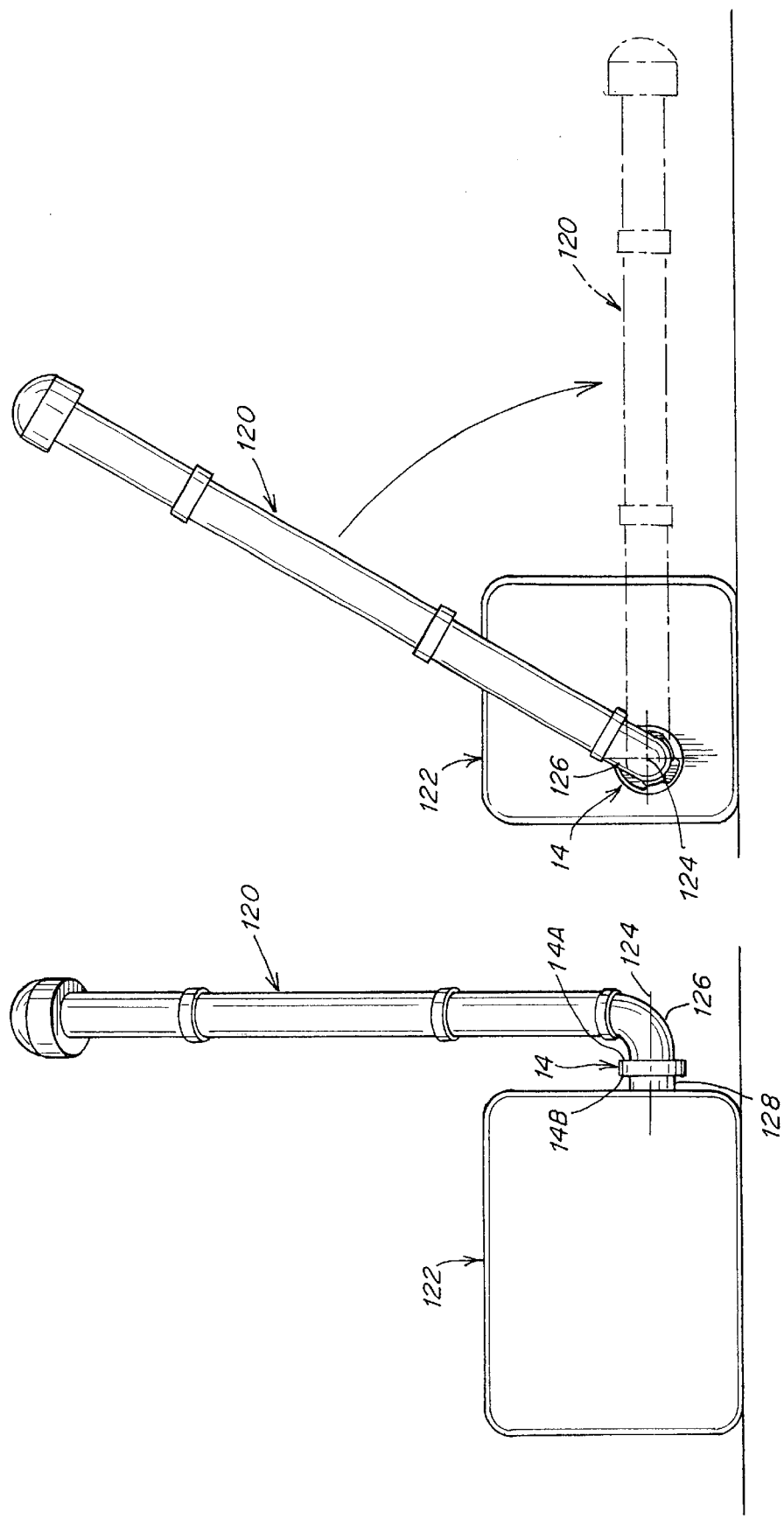

CONNECTOR FOR SMALL ANIMAL CAGE SYSTEMS

This invention relates to cage systems for small animals and more particularly relates to connectors used to join various parts of the system together.

A number of small animal cage systems are presently available to house such animals as hamsters, ferrets, gerbils etc. One of the best known and most popular of these systems is sold under the trademark HABITRAIL by Rolf C. Hagen, Inc. of Montreal, Canada and its United States subsidiary Rolf C. Hagen (USA) Corp. of Mansfield, Mass. That system includes a large number of different items including cages, plastic enclosures such as living quarters, play stations, exercise and eating compartments, towers etc that are joined together by tubes of different length and connectors that couple the tubes and various items of the system with one another. Competitive systems have somewhat similar arrangements.

One object of the present invention is to provide a connector that is easy to use and operates effectively to join the various parts of the system together.

Another more specific object of the invention is to provide a connector that does not require a specific circumferential orientation between the connector and either of the parts of the system to be joined by the connector.

Another object of the present invention is to provide a connector that creates a strong and secure connection between the two parts of the system that are joined together by it.

In accordance with another aspect of the present invention, an object is to provide a connector that is easy to handle and has a good gripping surface so that it may be attached to and removed from any item to which it is joined.

In accordance with another aspect of the invention, an object is to provide a connector that accommodates a wide range of dimensional tolerances in the objects to which it is to be connected.

To accomplish these and other objects, the connector of the present invention includes an outer ring and an inner ring that are circumferentially movable with respect to one another. In accordance with one embodiment of the invention, the inner ring is discontinuous, composed of two or more sections with their adjacent ends closely spaced to form a substantially continuous ring. The discontinuity of the inner ring enables the effective diameter of the inner ring to be easily reduced so as to firmly grip a tube or other item that is to be engaged by the connector and greatly reduces manufacturing tool costs. The inner ring has a pair of parallel grooves on its inner surface that are designed to receive the ends of the members that are to be joined together by the connector. The ends of the members to be joined are essentially round so that they may fit within the inner rings and seat in the grooves. The connector and the mating ends of members to be joined by the connector may take many different forms that allow the connector to grip the members when the connector is in the locked position.

The outer surface of the inner ring and the inner surface of the outer ring carry a plurality of camming surfaces that are spaced apart a circumferential distance that is greater than that of the surfaces so that the rings can be moved relative to one another between a first position (unlocked) wherein the surfaces are disengaged in which case no compressive forces are applied to the inner ring by the outer ring, and a second position (locked) wherein they are engaged causing the outer ring to compress the inner ring to reduce its effective diameter so that it firmly grips the members. In the first position the inner ring is sized to receive the ends of the members that are to be joined together while in the second position the connector is locked onto the members so that they can not be pulled apart or otherwise separate from one another.

In accordance with another aspect of the invention, separate camming surfaces are provided on both the inner and outer rings for each side of the connector that receives one of the members that are to be joined together. The camming surfaces on one side of the connector are axially aligned with the spaces between the cam surfaces on the other side so that the compression exerted on the inner ring by the outer ring when the camming surfaces are engaged is spread evenly about the connector.

In accordance with yet another aspect of the invention, the inner ring is co-injected or insert molded with a gasket made of a yieldable material so as to more firmly engage the ends of the members coupled by the connector.

The foregoing objects and features of the invention will be better understood and appreciated from the following description of a preferred embodiment thereof read in connection with the accompanying drawings.

BRIEF FIGURE DESCRIPTION

FIG. 1 is a perspective view showing the connector of the present invention joining two tubular segments, one being straight and the other curved;

FIG. 2 is a cross sectional view of the assembly of connector and tubing shown in FIG. 1 taken along the section line 2—2 in that figure;

FIG. 2A is an enlarged cross-sectional view of the portion of FIG. 2 encircled by arrows 2A—2A;

Figure 3:
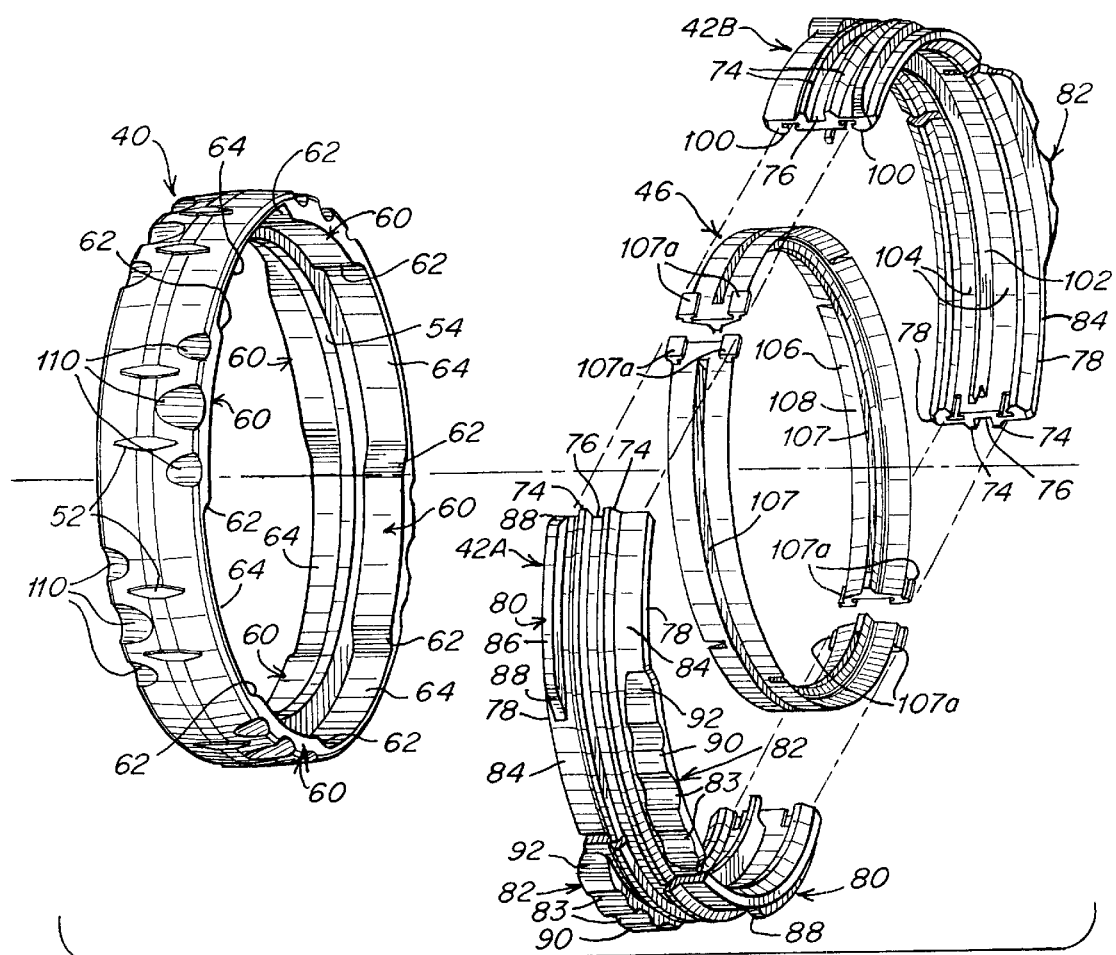
FIG. 3 is an exploded perspective view of the connector showing its various components.
Figure 4:
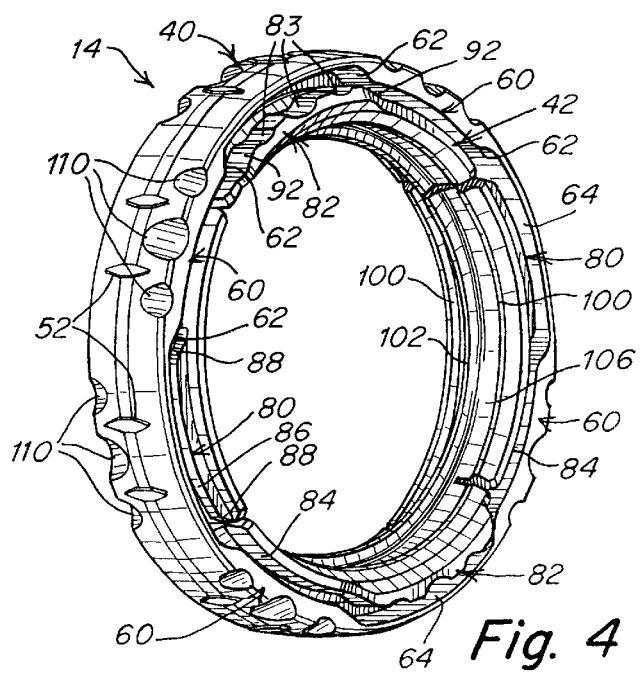
FIG. 4 is a perspective view of the connector detached from tubing or other members of the assembly and showing the inner and outer rings in their unlocked position.

FIG. 12 is a side elevation view of a component and tube subassembly connected together in their normal assembled position and joined by the connector of the present invention; and FIG. 13 is an end view of the subassembly of FIG. 12 and showing how the connector may engage and maintain the connection of the component and tube even when the tube slips from its intended position shown in full lines to the slipped position shown in broken lines.

DETAILED DESCRIPTION

In FIG. 1 a typical application of the present invention is shown wherein a pair of tubular members 10 and 12 are joined together by a connector 14. While tubular members 10 and 12 are straight and curved tube segments respectively, it is to be understood that the connector of the present invention may be used to join any two members together that have a tubular collar-like end that preferably has a bead on its outer surface at its free edge. For example, the tubular member 12 is shown to have a bead 16 on its outer surface 18 adjacent its edge 20. Each end of each of the tubular members 10 and 12 has such a bead. The end 22 of the tubular member 12 serves as a collar that may be inserted into the connector 14 as is described in detail below. The bead may be approximately ⅛ inch wide and 1/16 inch high, and preferably it is beveled toward the end of the tube. It is to be understood however that the bead may be of different dimensions as dictated by the size and other physical characteristics of the connector 14. Furthermore, the tubes 10 and 12 are only representative of any type of member that is connected as part of the cage assembly with other parts thereof, such as living quarters, play stations, exercise or eating compartments, towers etc. The number of different members that may be connected in such assemblies is almost limitless, and the connector of this invention may be used to connect any member to another so long as the ends of the members have a shape complimentary to the connector. In the following description, the members joined together by the connector are sometimes called tubes, but it is to be understood that when "tube" is used it includes by definition any other part of the assembly that is provided with a collar-like fitting to register with the connector.

The tube connector 14 is shown in detail in FIGS. 2–11. The connector 14 includes outer and inner rings 40 and 42 that are circumferentially movable with respect to one another. The outer ring 40 typically may be made of a variety of materials such as styrene, and may be injection molded by techniques well known in the art. The inner ring in the embodiment shown that may be made of polypropylene or other similar material is preferably discontinuous, that is, it is composed of two or more arcuate components 42A and 42B (two segments are shown in the illustrated embodiment) that together comprise an essentially continuous ring. Each segment is preferably co-injected or insert molded with an inner portion 46 that is relatively flexible and typically made of an elastomeric material. The inner portion 46 serves as a gasket identified in the following description and shown in the drawings at 106 to firmly engage the two collar-like ends on the members to be joined by the connector 14. The two segments 42A and 42B in the embodiment illustrated, when inserted within the outer ring 40, form a continuation of one another to define an essentially continuous inner ring 42 within the outer ring 40.

Figure 5:
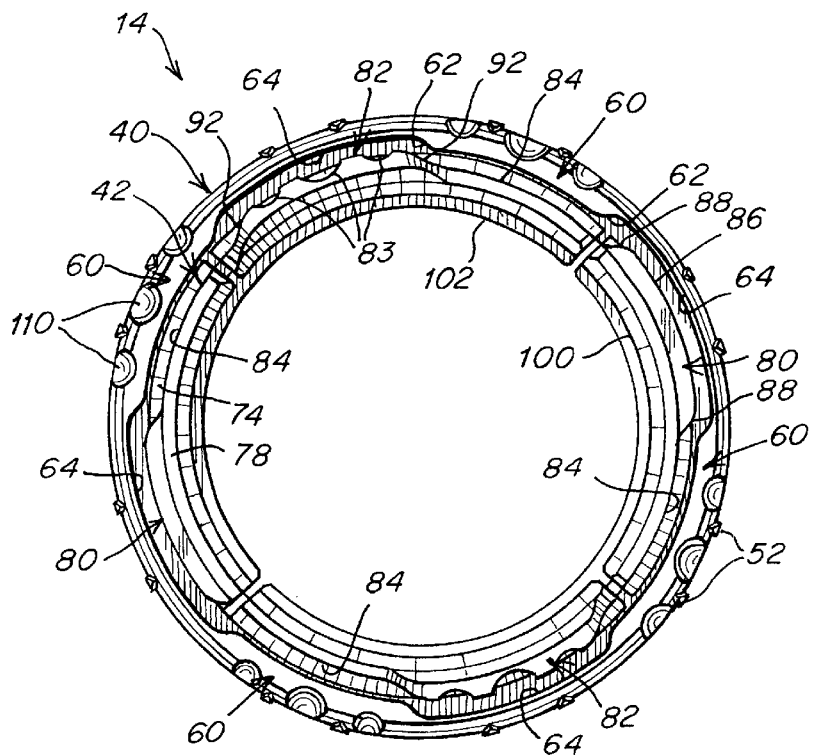
FIGS. 5 and 6 are side views of the connector in the unlocked and locked position, respectively.
Figure 6:
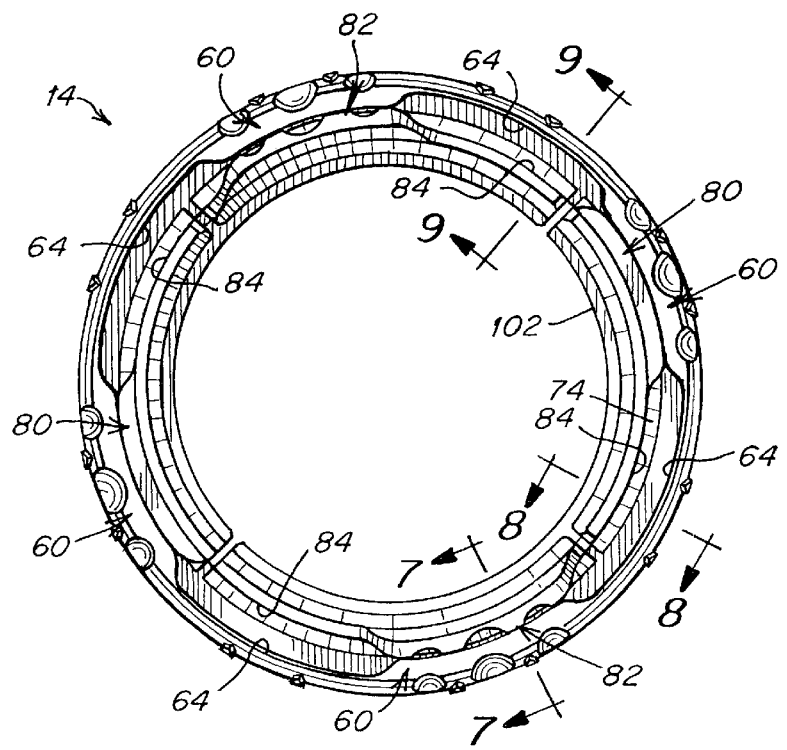
Figure 7:
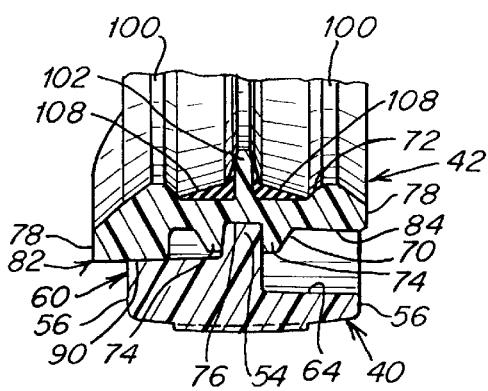
FIGS. 7, 8 and 9 are cross sectional views of the connector taken along the corresponding section lines in FIG. 6.
Figure 8:
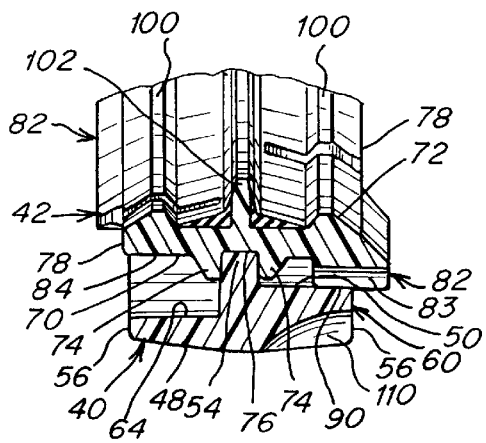
Figure 9:
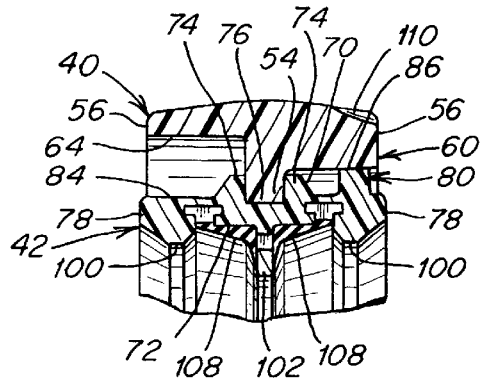
Figure 10:
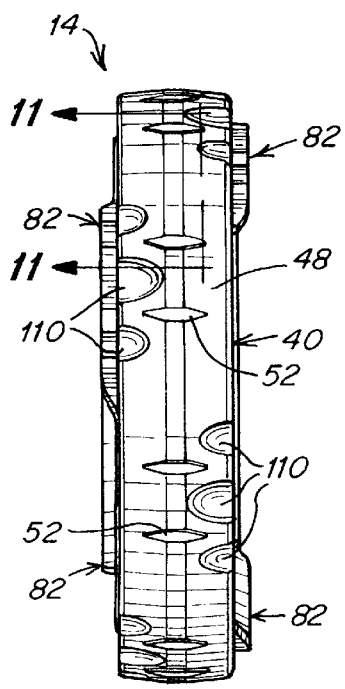
FIG. 10 is an end view of the connector ring shown.
Figure 11:
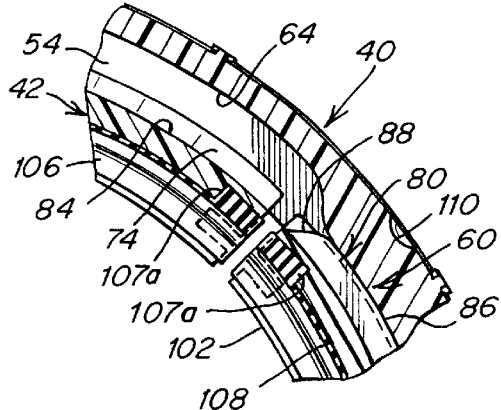
FIG. 11 is a cross sectional view taken along the section line 11—11 in FIG. 10.

The outer ring 40 is shown in detail particularly in the cross-sectional views of FIGS. 7, 8, 9 and 11 and in FIG. 3. The outer ring 40 has outer and inner surfaces 48 and 50, and the outer surface carries a number of ribs 52 that facilitate gripping of the outer ring. It should, of course, be appreciated that while ribs are shown formed in the outer surface 48 of the outer ring for that purpose, the surface can be otherwise configured such as with knurls, bumps, etc. for accomplishing the same purpose. The inner surface 50 of the outer ring 40 carries a radially, inwardly extending rib 54 about the inner circumference of the outer ring 40 essentially midway between the outer edges 56. The rib 54 in the embodiment shown is continuous. The rib 54 serves to stiffen the outer ring and also provides a track on which the inner ring 42 is mounted as is described in more detail below. Also disposed on the inner surface 50 of the outer ring 40 on each side of the rib 54 are inwardly extending protrusions 60 that bear upon the outer surface of the inner ring so as to compress the inner ring against the tubular members coupled together by the tube connector 14 of this invention. That action is described in substantial detail below. The protrusions 60 are shown in FIGS. 3, 5 and 6 to be equidistantly spaced about the inner circumference of outer ring 40, with the protrusions on one side of the rib 54 being aligned with the space between adjacent protrusions on the other side of the rib. The circumferential ends of the protrusions 60 are defined by inclined ramps 62. The gaps between adjacent protrusions 60 are identified at 64. The circumferential length of the protrusions 60 is slightly less than the circumferential length of the gaps 64. As is particularly evident in FIG. 3, the protrusions 60 on each side of the rib 54 are circumferentially displaced from one another so that the gaps 64 on one side of the rib 54 are aligned with the protrusions 60 on the other side thereof.

The inner ring 42 has outer and inner surfaces 70 and 72, and the outer surface 70 has a pair of radially outwardly extending beads 74 that between them define a recess 76 that receives the rib 54 on the inner surface of the outer ring 40. The recess 76 is equidistantly spaced from the edges 78 of the inner ring. The outer surface 70 of the inner ring carries a plurality of cams 80 and 82 that are spaced apart as suggested at 84 (see FIG. 3). The cams 80, in the embodiment shown, are in the form of straight ribs that have smooth outer surfaces 86 and ramp-like ends 88. The cams 82 have dimples 83 on their upper surface 90, and their ends are ramped as suggested at 92. Furthermore, the cams 82 are wider than the cams 80 so that their outer edges extend beyond the edges of the remaining portions of the inner ring. The dimples 83 in the embodiment shown, are, therefore, visible beyond the edges 56 of the outer ring. The radial height of the cams 80 and 82 are essentially the same. The cams 80 and 82 are alternately provided on the outer surface 70 of the inner ring on each side of the recess 76 and separated by the spaces 84, and the cams are each circumferentially aligned with a space 84 on the opposite side of the recess. The cams 80 and 82 cooperate with the protrusions 60 on the inner surface of the outer ring so as to apply compressive forces to the inner ring causing the inner ring, in turn, firmly to engage the tubes joined by the connector.

The inner surface 72 of the inner ring 42 in the embodiment shown carries radially inwardly extending shoulders 100 disposed inwardly of the edges 78 and spaced from a central radially inwardly extending fin 102 disposed along the approximate center line of the inner surface 72 (see FIGS. 2A, 7, 8 and 9). The shoulders 100 and fin 102 define two spaced apart seats 104 into which the gasket 106 is co-injected or insert molded. As the gasket 106 is made of a yieldable material such as an elastomer, when pressed against a surface such as a bead on the collar-like coupling on the tubes, the gasket will firmly grip on it.

The gasket 106 of the inner ring 42 is shown separately in FIG. 3 before it is co-injected or insert molded with the ring. The gasket has a central circumferential slot 107 through which the fin 102 extends in the finished product (also see FIGS. 2A and 7–9). The gasket segments shown in FIG. 3 have small feet 107a at each end that merge with the ends of the segments of the inner ring to firmly anchor the two parts 42a and 42b together and may also form a cushion between the ends of the parts of the inner ring when assembled in the outer ring 40. The inner surface 108 of the gasket is shown in FIGS. 3 and 6–9 to provide inclined surfaces for engaging the couplings and more particularly the ends of the tubes when in use to couple segments of the assembly together.

As stated above, in the embodiment illustrated, the outer ring 40 is rotatable with respect to the inner ring while the inner ring remains in place connected to the outer ring by virtue of the registration of the rib 54 on the outer ring with the recess 76 on the outer surface of the inner ring 42. When the outer ring 40 is disposed on the inner ring in a circumferential position such that protrusions 60 on the inner surface of the outer ring on each side of the rib 54 are out of registration with the cams 80 and 82 on the outer surface of the inner ring, and rather are disposed opposite the spaces 84 between the cams as shown in FIG. 5, the outer ring does not exert any compressive forces on the inner ring except as those that may be generated in reaction to an outward pressure exerted on the inner surface of the inner ring by the tubes to be coupled together by the connector 14. That force, if any, however does not impede the rotation of the outer ring with respect to the inner ring so that the protrusions 60 may be caused to ride up on the cams and cause a compressive force to be exerted on the inner ring so as to essentially contract its diameter. In FIG. 6, the connector is shown in the operative position. It should be noted that the protrusions 60 engage the cams 80 and 82 so as to exert radially inwardly directed pressure on the inner ring 42 so as to cause the gasket 106 to tighten on the collar-like couplings on the ends of the tubes. It should be appreciated that the protrusions and cams on both sides of the connector 14 act together to either compress or release the inner ring.

FIGS. 12 and 13 illustrate one of the many advantages of the present invention. The connector enables the two components to be joined together in any angular relationship. For example, the tube 120 extends upwardly one to the side of the compartment 122 as shown in FIG. 13. If the weight of the tube for any reason is too much for the connector 14 to handle, the connector will act as a clutch and allow the tube 120 to slip slowly about the axis 124 of the coupling without separating from either the tube or compartment. The slippage will occur on the side 14A of the connector 14 that engages the coupling 126 on the end of the tube, and not on the other side 14B of the connector that engages the coupling 128 on the compartment 122. While the elastomer portion 106 of the inner ring 42 will stick to the normally polished surface of the couplings under normal conditions, of the weight imposes a twisting torque on one of the components that exceeds the load the connector is able to resist, one of the components will rotate slowly and avoid server impact and thereby protect an animal in the tube, prevent detachment thereof so that the animal will not escape, and prevent breakage of the component. This is suggested by the broken line showing of the tube in FIG. 13. The connector continues to maintain the secure connection between the components and resists all side impacts.

While in the foregoing description the inner ring has been described as being discontinuous and in the embodiment shown is made up of two segments, it will be appreciated that the inner ring may be divided into more than two segments or the inner ring may be continuous without any breaks therein depending upon the flexibility and compressibility of the material from which the inner ring is made. Therefore, variations as to the number of ring segments that are employed are within the scope of the present invention. It will also be appreciated that while in the illustrated embodiment, the inner ring is made by co-injection or insert molding and the gaskets are made of a different material than the remaining portion of the inner ring, the inner ring may be made from a single material as long as it is capable of compressing (contracting in diameter) in response to forces being applied to it by the outer ring. Furthermore, while in the embodiment illustrated four protrusions and four cams are provided on each side of the rib 54 of the outer ring 40 and on each side of the recess 76 of the inner ring 42, different numbers may be employed. It is, however, advantageous to stagger the relationship of the cams and protrusions on the inner and outer rings as shown in the illustrated embodiment so as to promote the equalization of pressures about the circumference of the connector.

It is evident from the forgoing description that numerous modifications may be made of the illustrative embodiment without departing from the spirit of this invention. Therefore, scope of this invention is not to be limited to the embodiments illustrated and described. Rather, the scope of this invention is to be determined by the appended claims and their equivalents.

What is claimed is:

1. A tube connector comprising
   an outer ring having inner and outer surfaces, gripping means on the outer surface of the outer ring for facilitating gripping of the outer ring for rotating it about its axis,
   a seat on the inner surface of the outer ring for an inner ring,
   an inner ring having inner and outer surfaces, said inner ring being concentric with the outer ring and engaging the seat for enabling the outer ring to rotate about its axis relative to the inner ring,
   said inner surface of the inner ring for directly engaging opposed ends of tubes, and
   a plurality of cams on the outer surface of the inner ring and a plurality of inwardly extending protrusions on the inner surface of the outer ring for selectively engaging the cams when the two rings are in a first circumferential position with respect to one another to compress the inner ring and the opposed ends, and for disengaging the cams to relieve pressure on the inner ring and the opposed ends in a second circumferential position.

2. A tube connector comprising
   inner and outer concentric rings that move circumferentially with respect to one another,
   an interconnection between the rings for holding the inner ring within the outer ring,
   camming surfaces on the inner surface of the outer ring and the outer surface of the inner ring for compressing the inner ring for engaging opposed ends of a pair of tubes when the camming surfaces are in registration with one another and relieving the compression on the inner ring when the camming surfaces are out of registration with one another, and
   a pair of seats on the inner surface of the inner ring, each of the pair of seats for engaging one of the opposed ends of the pair of tubes for connecting toe ends of the pair of tubes in end-to-end relationship.

3. A tube connector as described in claim 1 wherein the inner ring has a discontinuity in it for enabling the inner ring to contract circumferentially when it is compressed.

4. A tube connector as described in claim 2 wherein the inner ring has a discontinuity in it for enabling the inner ring to contract circumferentially when it is compressed.

5. A tube connector as described in claim 2 wherein the interconnection of the rings includes a rib on one of the rings and a groove in the other allowing the rings to turn with respect to one another.

6. A tube connector as described in claim 1 wherein the inner ring has a gripping surface made of an elastomeric material.

7. A tube connector as described in claim 2 wherein the inner ring has a gripping surface made of an elastomeric material.

8. A tube connector as described in claim 5 wherein the inner ring is made of an elastomeric material.

9. A tube connector as described in claim 4 wherein separate camming surfaces on the inner and outer rings are operatively aligned with each of the seats on the inner surface of the inner ring for separately compressing the seats against the ends of the tubes engaged by the seats.

10. A tube connector as described in claim 9 wherein there are a plurality of camming surfaces on the outer surface of the inner ring and a plurality of camming surfaces on the inner surfaces of the outer ring and wherein the outer ring may be turned in either direction with respect to the inner ring to move the camming surfaces into and out of registration with one another.

11. A tube connector as described in claim 9 wherein the camming surfaces operatively associated with one of the seats are displaced circumferentially with respect to the camming surfaces operatively associated with the other of the seats.

12. A connector for joining the ends of two tubular members having raised beads at the ends to be joined together comprising:

an inner ring having radially inner and outer sides and circumferential side edges, a circumferential ridge dividing the inner side into a pair of circumferential seats, one on each side of the ridge, each seat for receiving the bead on the end of one of the tubular members, a radially inwardly extending flange on each side edge and defining together with the ridge the pair of seats, a plurality of raised cams on the outer side of the inner ring separately radially aligned with one or the other of the seats on the inner side of the inner ring, an outer ring interconnected to and surrounding the inner ring and having inner and outer sides with radially inwardly extending protrusions on the inner side thereof for selectively engaging the cams on the outer sides of the inner ring for compressing the inner ring against the beads on the ends of the tubular members for holding their ends in fixed relationship to one another, said outer ring being rotatable on the inner ring for selectively engaging and disengaging the protrusions and cams with one another.

13. A connector as defined in claim 12 wherein the inner ring is composed of separate segments that together comprise the ring.

14. A connector as defined in claim 13 wherein the ends of the segments are spaced apart to facilitate compressing the inner rings on the ends of the tubes.

15. A connector as defined in claim 12 wherein the outer side of the outer ring has grippers for assisting in rotating the outer ring on the inner ring.

16. A connector as defined in claim 12 wherein adjacent cams on the outer side of the inner ring are spaced apart a greater circumferential distance than the circumferential extent of the protrusions on the outer ring.

17. A connector as defined in claim 12 wherein the cams on the inner ring aligned with one of the seats are circumferentially displaced from the cams aligned with the other seat.

18. A connector as defined in claim 13 wherein the cams on the inner ring aligned with one of the seats are circumferentially displaced from the cams aligned with the other seat.

19. A connector as defined in claim 18 wherein the outer side of the outer ring has grippers for assisting in rotating the outer ring on the inner ring.

20. A connector as defined in claim 12 wherein the seats are made at least in part of an elastomeric material.

21. A connector as defined in claim 12 wherein the inner ring is co-injected or insert molded of a relatively rigid plastic material and with the seats made of an elastomeric material.

22. A connector as defined in claim 21 wherein the inner ring is discontinuous.

* * * * *